United States Patent
Iwamoto

(10) Patent No.: US 9,612,639 B2
(45) Date of Patent: Apr. 4, 2017

(54) ELECTRONIC DEVICE HAVING CHARGEABLE BATTERY, METHOD OF CHARGING, AND STORAGE MEDIUM

(71) Applicant: CASIO COMPUTER CO., LTD., Tokyo (JP)

(72) Inventor: Kenji Iwamoto, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 205 days.

(21) Appl. No.: 14/482,459

(22) Filed: Sep. 10, 2014

(65) Prior Publication Data
US 2015/0095669 A1    Apr. 2, 2015

(30) Foreign Application Priority Data
Sep. 30, 2013   (JP) ................ 2013-204960

(51) Int. Cl.
G06F 1/26    (2006.01)
H04N 5/232   (2006.01)
H02J 7/00    (2006.01)

(52) U.S. Cl.
CPC .............. G06F 1/263 (2013.01); G06F 1/266 (2013.01); H02J 7/0073 (2013.01);
(Continued)

(58) Field of Classification Search
CPC .. G06F 1/263; G06F 1/266; H02J 2007/0049; H02J 2007/006;
(Continued)

(56) References Cited

U.S. PATENT DOCUMENTS 7,289,778 B2*  10/2007  Sasaki .................... H01G 9/155
                                                    323/263
2005/0156569 A1*  7/2005  Patino ................. H01M 10/425
                                                    320/128
(Continued)

FOREIGN PATENT DOCUMENTS

JP    2001-100868 A    4/2001
JP    2002-237971 A    8/2002
(Continued)

OTHER PUBLICATIONS

Japanese Office Action dated Oct. 9, 2015, in a counterpart Japanese patent application No. 2013-204960.

Primary Examiner — Thomas Lee
Assistant Examiner — Chad Erdman
(74) Attorney, Agent, or Firm — Chen Yoshimura LLP

(57) ABSTRACT

An electronic device includes a chargeable battery, a system section, and a charging control section. The charging control system allocates electrical current supplied from the external device to the system section for use thereby and the battery for charging. The charging control section stops charging of the battery temporarily when a prescribed condition is met in the system section and the electrical current supplied via the cable is not a maximum current for the cable, and regulates the electrical current supplied via the cable to be at a constant level below the maximum current. The charging control section supplies electrical current from the battery to the system section as needed to meet a power demand by the system section that is not met by the electric current via the cable, while the electrical current supplied via the cable is being regulated to be at the constant level.

15 Claims, 8 Drawing Sheets

(52) U.S. Cl.
CPC ........ *H04N 5/23241* (2013.01); *H02J 7/0047* (2013.01); *H02J 7/0052* (2013.01); *H02J 2007/006* (2013.01); *H02J 2007/0049* (2013.01); *H02J 2007/0062* (2013.01)

(58) Field of Classification Search
CPC ............. H02J 2007/0062; H02J 7/0047; H02J 7/0052; H02J 7/0073; H04N 5/23241
See application file for complete search history.

(56) References Cited

U.S. PATENT DOCUMENTS

| | | | | |
|---|---|---|---|---|
| 2011/0148205 | A1* | 6/2011 | Moon | H02J 3/32 307/65 |
| 2013/0082662 | A1* | 4/2013 | Carr | H02J 7/0052 320/134 |
| 2014/0012426 | A1* | 1/2014 | Funakubo | H02J 3/32 700/286 |
| 2014/0042814 | A1* | 2/2014 | Kather | H02J 7/34 307/59 |

FOREIGN PATENT DOCUMENTS

| | | |
|---|---|---|
| JP | 2007-281911 A | 10/2007 |
| JP | 2008-113528 A | 5/2008 |
| JP | 2011-065286 A | 3/2011 |

* cited by examiner

ELECTRONIC DEVICE HAVING CHARGEABLE BATTERY, METHOD OF CHARGING, AND STORAGE MEDIUM

BACKGROUND OF THE INVENTION

Field of the Invention

The present invention relates to power supply control of an electronic device.

Description of Related Art

Technology is known in which a USB (universal serial bus) cable is conventionally used to charge batteries, supply power to an electronic device (system), or to transmit data by connecting a PC (personal computer) to an electronic device having an embedded battery (secondary battery) capable of being charged, such as a digital camera, tablet terminal, or smartphone.

Technology is also known in which a digital camera and PC are connected by a USB cable, and the current supplied from the PC minus the amount of current needed for data transmission with the PC is used to charge the batteries, for example.

Furthermore, if the digital camera is constituted of a plurality of functional blocks and connected by a USB cable to the PC, then the power capable of being supplied from the PC is confirmed, and the supplied power is allocated to prescribed functional blocks on the basis of these confirmation results.

The amount of current that can be supplied to the electronic device from the USB terminal of the PC, however, is limited to a maximum of 500 mA or the like, for example. FIG. 8 is a conceptual view of one example of power being supplied to an electronic device by a USB cable using conventional technology. In FIG. 8, the horizontal axis is time and the vertical axis is current supplied from the PC, or namely the current flowing to the USB cable. When the USB cable is connected, from time t0 to t1 a current that changes in accordance with load variation is continually supplied to the system section (electronic circuits, driving section, and the like), and excess current out of the 500 mA is supplied to the battery.

At time t1, the battery has been charged to a certain degree and the charging current is reduced, and then further reduced the closer the battery is to being fully charged. At time t6, the battery is fully charged and the charging stops (the charging current becomes zero), and only the system current remains. In other words, the current of the USB cable changes as shown by a solid line L1 in the drawing.

In this manner, if the sum of the current and charging current supplied to the system section in conventional technology is less than or equal to the current 500 mA usable by the USB terminal (after time t1), then changes in the current or the charging current after load fluctuations of the system section will appear as a change in the current flowing through the USB terminal and the USB cable, as shown by the solid line L1 in FIG. 8. In particular, the current has relatively large fluctuations when a zoom lens or focus lens in the system section is driven by a motor, as shown by still image importing in times t2 to t3 or live image importing in times t4 to t5, or when high-grade image processing is performed. The changes in current caused by these load fluctuations in the system section also change the current flowing to the USB cable, and thus, the USB cable becomes a source of EMI (electro-magnetic interference) and noise.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages, as embodied and broadly described, in one aspect, the present invention provides an electronic device, including: a battery that can be charged; a system section; and a charging control section connected to the system section and the battery, the charging control section being configured to receive external power from an external device via a cable, the charging control section allocating electrical current that is supplied from the external device to the system section for use thereby and the battery for charging, wherein the charging control section stops charging of the battery temporarily when a prescribed condition is met in the system section and the electrical current supplied via the cable is not a maximum current for the cable, wherein the charging control section regulates the electrical current supplied via the cable to be at a constant level below the maximum current while the charging of the battery is temporarily stopped, and wherein the charging control section supplies electrical current from the battery to the system section as needed to meet a power demand by the system section that is not met by the electric current via the cable, while the electrical current supplied via the cable is being regulated to be at the constant level.

In another aspect, the present invention provides a method of allocating electrical current that is supplied from an external device via a cable to a battery and a system section in an electronic device having the battery and the system section, the method including: stopping charging of the battery temporarily when a prescribed condition is met in the system section and the electrical current supplied via the cable is not a maximum current for the cable; regulating the electrical current supplied via the cable to be a constant level below the maximum current while the charging of the battery is temporarily stopped; and supplying electrical current from the battery to the system section as needed to meet a power demand by the system section that is not met by the electric current via the cable, while the electrical current supplied via the cable is being regulated to be at the constant level.

In another aspect, the present invention provides a digitally-readable non-transitory storage medium stores instructions executable by a processor in an electronic device that allocates electrical current that is supplied from an external device via a cable to a battery and a system section, the instructions causing the electronic device to perform the following: stopping charging of the battery temporarily when a prescribed condition is met in the system section and the electrical current supplied via the cable is not a maximum current for the cable; regulating the electrical current supplied via the cable to be at a constant level below the maximum current while the charging of the battery is temporarily stopped; and supplying electrical current from the battery to the system section as needed to meet a power demand by the system section that is not met by the electric current via the cable, while the electrical current supplied via the cable is being regulated to be at the constant level.

It is to be understood that both the foregoing general description and the following detailed description are exemplary and explanatory, and are intended to provide further explanation of the invention as claimed.

BRIEF DESCRIPTION OF THE DRAWINGS

A deeper understanding of the present invention can be obtained by referring to the drawings described below alongside the detailed descriptions given later.

DETAILED DESCRIPTION OF THE PREFERRED EMBODIMENTS

Embodiments of the present invention will be described in detail below with reference to the drawings.

A. Embodiment 1

First, Embodiment 1 of the present invention will be described.

A-1. Configuration of Embodiment 1

Figure 1:
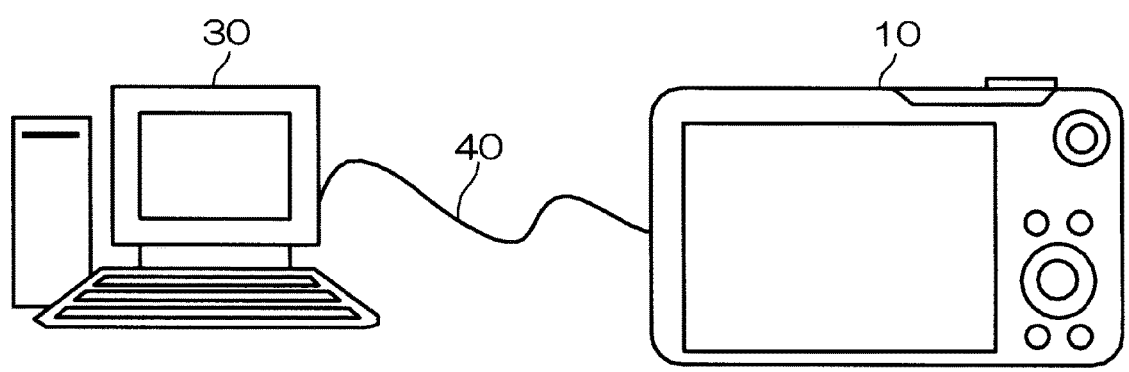
FIG. 1 is a conceptual view of charging by connecting a USB cable to a digital camera according to Embodiment 1.

FIG. 1 is a conceptual view of charging by connecting a USB cable to a digital camera 10 according to Embodiment 1 of the present invention. In FIG. 1, the digital camera 10 is connected to a PC 30 by a USB cable 40. The USB cable 40 is connected to a USB terminal (not shown) of the digital camera 10 and a USB terminal (not shown) of the PC 30. A maximum current of 500 mA can be supplied to the digital camera 10 from the PC 30, for example.

Figure 2:
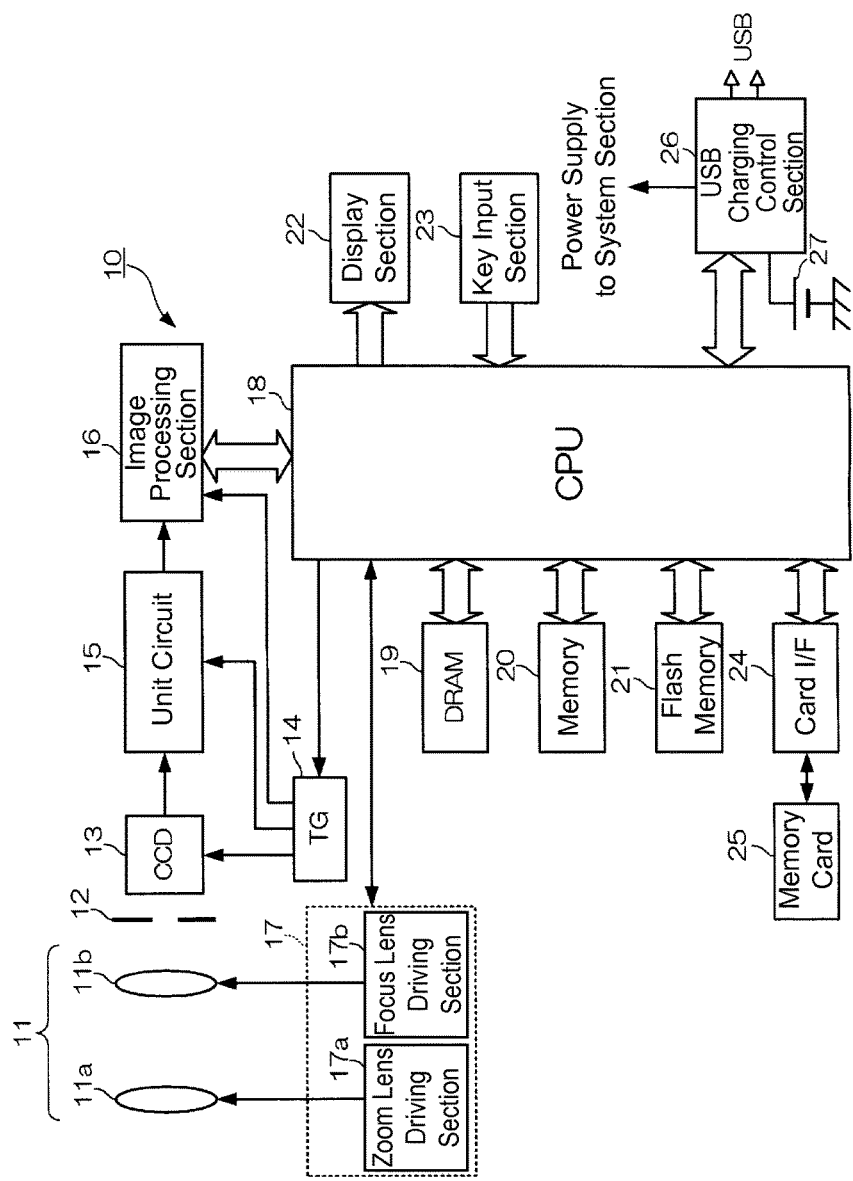
FIG. 2 is a block diagram of the digital camera according to Embodiment 1.

FIG. 2 is a block diagram of the digital camera 10 according to Embodiment 1 of the present invention. In FIG. 2, the digital camera 10 has an imaging lens 11, a diaphragm-shutter 12, a CCD 13, a TG (timing generator) 14, a unit circuit 15, an image processing section 16, a lens driving section 17, a CPU 18, a DRAM 19, a memory 20, a flash memory 21, a display section 22, a key input section 23, a card I/F 24, a memory card 25, a USB charging control section 26, and a battery 27.

The imaging lens 11 includes a zoom lens 11a and a focus lens 11b and is connected to the lens driving section 17. The lens driving section 17 is constituted of a zoom lens driving section 17a that drives the zoom lens 11a and a focus lens driving section 17b that drives the focus lens 11b. The zoom lens driving section 17a is made of a zoom motor that drives the zoom lens 11a in the optical axis direction in accordance with control signals from the CPU 18, and a zoom motor driver that drives the zoom motor. The focus lens driving section 17b is made of a focus motor that drives the focus lens 11b in the optical axis direction in accordance with control signals from the CPU 18, and a focus motor driver that drives the focus motor.

The focus motor and zoom motor (not shown) are stepper motors that precisely move the zoom lens 11 and the focus lens 11b along the optical axis by step driving that corresponds to control signals from the CPU 18. A detecting structure (an encoder or the like) that detects the position of the zoom lens 11a and the focus lens 11b is disposed on the driving structure of the focus motor and zoom motor (not shown) or the zoom lens 11a and the focus lens 11b. The position of the zoom lens 11a and the focus lens 11b is constantly fed to the detecting structure as feedback.

The diaphragm-shutter 12 includes a driving circuit (not shown) and operates in accordance with control signals from the CPU 18 by the driving circuit. The diaphragm-shutter 12 controls the amount of light entering the zoom lens 11a and the focus lens 11b. The CCD (imaging device) 13 converts the light of the photographic subject projected through the zoom lens 11a, the focus lens 11b, and the diaphragm-shutter 12 into electrical signals, and then outputs these electrical signals as image signals to the unit circuit 15. The CCD 13 is driven according to timing signals generated by the TG 14.

The unit circuit 15 is constituted of a CDS (correlated double sampling) circuit that uses correlated double sampling on the image signals outputted by the CCD 13, an AGC (automatic gain control) circuit that uses automatic gain control on the image signals after sampling, and an A/D converter that converts the analog image signals after automatic gain control into digital signals. The unit circuit 15 is driven according to timing signals generated by the TG 14. The image signals of the CCD 13 are sent as digital signals to the image processing section 16 through the unit circuit 15.

The image processing section 16 performs image processing of image data sent by the unit circuit 15 (pixel interpolation, γ correction, generation of luminance color difference signals, white balance processing, exposure compensation, and the like), compression and expansion of image data (compression and expansion of JPEG format and M-JPEG format or MPEG format, for example), trimming of photographic images, digital zooming of photographic images, and the like. The image processing section 16 is driven by timing signals generated by the TG 14.

The CPU 18 is a one-chip microcomputer that controls the respective parts of the digital camera 10. In particular, in Embodiment 1, the CPU 18 controls the zoom lens driving section 17a that drives the zoom lens 11a during zoom-in/zoom-out and the focus lens driving section 17b that drives the focus lens 11b for autofocus, and also controls image processing of photographic images by the image processing section 16, display of the photographic images on the display section 22 after image processing (live view display), operation of the USB charging control section 26 (described later), and the like.

The DRAM 19 temporarily stores image data sent to the CPU 18 as buffer memory after imaging by the CCD 13 and is used as a working memory of the CPU 18. The CPU 18 runs the above-mentioned processes on the photographic images stored in the DRAM 19. The memory 20 records programs and data necessary for the CPU 18 to control the individual parts of the digital camera 10, and the CPU 18 runs processes in accordance with these programs. The flash memory 21 and the memory card 25 are storage media that store image data taken by the CCD 13 and the like.

The display section 22 includes a color liquid crystal display device and a driving circuit therefor, and displays photographic images taken by the CCD 13 as live view images when in a standby state. The display section 22 reads from the flash memory 21 or the memory card 25 during reproduction of the recorded images and displays decompressed recorded images. The key input section 23 includes a plurality of operating keys such as a shutter switch, zoom switch, mode key, SET key, and cross key, and the key input section 23 outputs the operation signal corresponding to the key operation of the user to the CPU 18. The memory card 25 is inserted in the card I/F 24 through a card slot (not shown) of the digital camera 10 body so as to be detachable.

The USB charging control section 26 supplies current via the USB cable 40 to operate the system section and to charge the battery 27 in accordance with the amount of charge of the battery 27. More specifically, the USB charging control section 26 includes functions for regulating current supplied via the USB cable 40, monitoring the amount of charge of the battery 27, allocating current supplied via the USB cable 40 to the system section and the battery 27, controlling whether current supplied to the system section is supplied via the USB cable 40 or from the battery 27, and the like.

In particular, in Embodiment 1, when the zoom lens 11$a$ and the focus lens 11$b$ are driven by the focus motor and the zoom motor (not shown), or when high-grade image processing is performed by the image processing section 16, the system current has relatively large fluctuations. That is to say, it is known at the design stage which applications or processes (still image import processes or live image import processes) or the driving section in the system section have currents with relatively large fluctuations.

Thus, in Embodiment 1, when applications or processes (still image import processes or live image import processes) having currents with relatively large fluctuations are run or when the driving section (the focus motor and zoom motor driving the zoom lens 11$a$ and the focus lens 11$b$) is driven in the system section, the CPU 18 sends charging control signals to the USB charging control section 26.

When charging control signals are not being received from the CPU 18, the USB charging control section 26 as usual supplies a current that changes in accordance with load variation to the system section among the current (500 mA) supplied via the USB cable 40, and supplies excess current to the battery 27. On the other hand, when charging control signals are received from the CPU 18, the USB charging control section 26 stops the charging of the battery 27, maintains a current value supplied via the USB cable 40, and supplies the current needed for the load fluctuations to the system section from the battery 27.

A-2. Operation of Embodiment 1

Next, the operation of Embodiment 1 will be explained.

Figure 3:
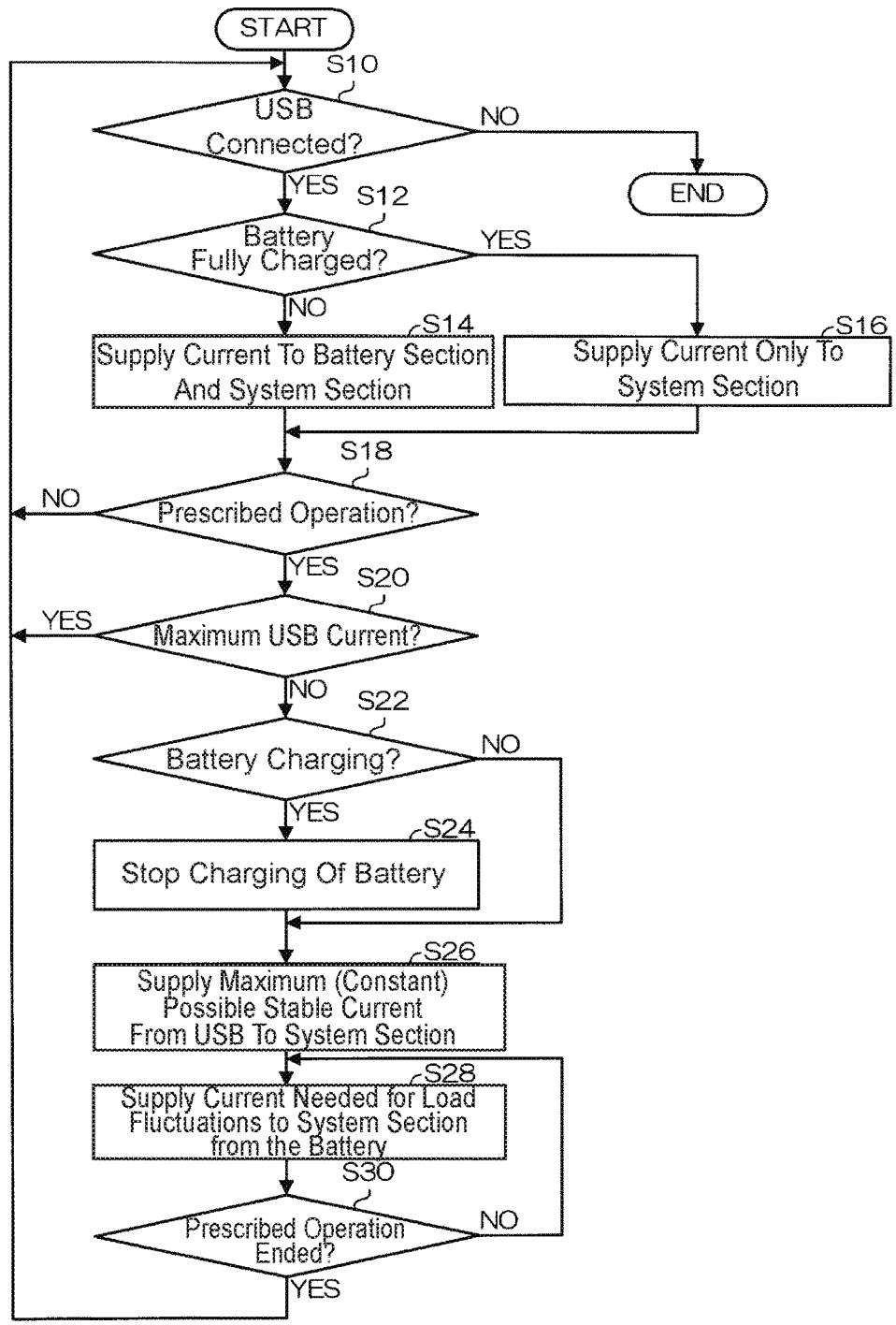
FIG. 3 is a flow chart for describing operation of the digital camera according to Embodiment 1.

FIG. 3 is a flow chart for describing the operation of the digital camera 10 according to Embodiment 1. First, the USB charging control section 26 determines whether the USB cable 40 is connected to the PC 30 (step S10). If the USB cable 40 is not connected to the PC (NO in step S10), the current process is terminated. However, if the USB cable 40 is connected to the PC 30 (YES in step S10), then the USB charging control section 26 determines whether the battery 27 is fully charged (step S12). If the battery 27 is not fully charged (NO in step S12), then the USB charging control section 26 supplies a current that changes in accordance with load variation to the system section and supplies excess current to the battery 27 as charging current via the USB cable 40 (step S14). However, if the battery 27 is fully charged (YES in step S12), then the USB charging control section 26 only supplies a current that changes in accordance with load variation to the system section via the USB cable 40 (step S16).

Next, the CPU 18 determines whether applications or processes (still image import processes or live image import processes) that have currents with relatively large fluctuations in the system section have been executed or whether the driving section (the focus motor and zoom motor that drive the zoom lens 11$a$ and the focus lens 11$b$) has been driven, or namely, the CPU 18 determines whether or not a specific operation has been performed (whether or not a specific condition has been met) (step S18). If a specific operation has not been performed (NO in step S18), then the CPU 18 returns to step S10 and repeats the above processes.

However, if a specific operation has been performed (YES in step S18), then the CPU 18 sends charging control signals to the USB charging control section 26. When the charging control signal is received from the CPU 18, the USB charging control section 26 determines whether the current being supplied via the USB cable 40 is the maximum (500 mA) (step S20). If the current being supplied via the USB cable 40 is the maximum (500 mA) (YES in step S20), then changes in accordance with load in the system section do not occur in the current flowing to the USB cable 40, and thus, the CPU 18 returns to step S10 and repeats the above processes.

However, if the current being supplied via the USB cable 40 is not the maximum (500 mA) (NO in step S20), then changes in accordance with load in the system section occur in the current flowing to the USB cable 40. In this case, first the USB charging control section 26 determines whether or not the battery 27 is charging (step S22). If the battery 27 is charging (YES in step S22), then charging of the battery 27 is stopped (step S24). In other words, the USB charging control section 26 blocks the charging current for charging the battery 27 from being supplied via the USB cable 40.

Next, the USB charging control section 26 supplies the maximum (constant) current possible to be stably supplied via the USB cable 40 to the system section (300 mA, for example) (step S26), and further supplies the current needed for load fluctuations to the system section from the battery 27 that has stopped being charged (step S28). As a result, a relatively stable current that does not rely on load fluctuation of the system section for the specific operation flows to the USB cable 40, thus making it possible to reduce EMI and noise generated from the USB cable.

Next, the CPU 18 determines whether or not the specific operation has ended (step S30). If the specific operation has not ended (NO in step S30), then the CPU 18 continues sending charging control signals to the USB charging control section 26. The USB charging control section 26 continues receiving charging control signals from the CPU 18, and thus, the CPU 18 returns to step S28 and continues to supply an amount of current equal to load variation in the system section from the battery 27.

However, if the specific operation has ended (YES in step S30), then the CPU 18 stops sending charging control signals to the USB charging control section 26. The USB charging control section 26 stops receiving charging control signals from the CPU 18, and thus, the CPU 18 returns to step S10 and repeats the above processes. In other words, when the specific operation has stopped, if the battery 27 is not fully charged at that time, then in step S14 a current that changes in accordance with load variation is supplied to the system section through the USB cable 40, and the excess current is supplied to the battery 27 as charging current. However, if the battery 27 is fully charged, then in step S16 the USB charging control section 26 only supplies a current that changes in accordance with load variation to the system section via the USB cable 40.

Figure 4:
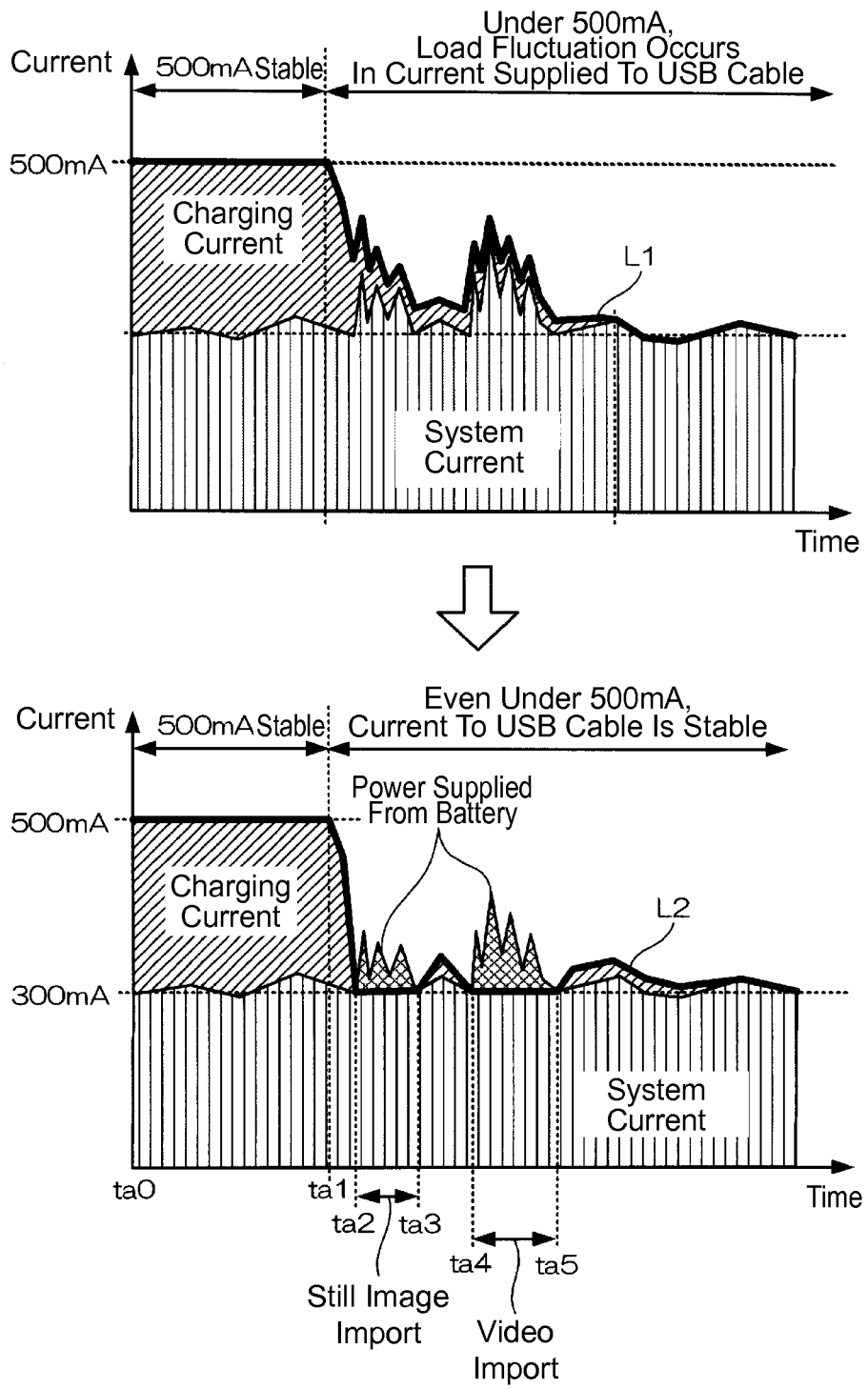
FIG. 4 is a conceptual view of one example of power being supplied to an electronic device by a USB cable according to Embodiment 1.

FIG. 4 is a conceptual view of one example of power being supplied to an electronic device using the USB cable 40 according to Embodiment 1. In FIG. 4, the top drawing is power supply by conventional technology and the bottom drawing is power supply by Embodiment 1. Each drawing shows the horizontal axis as time and the vertical axis as supply current from the PC 30, or namely current flowing to the USB cable 40. When the USB cable 40 is connected, from time ta0 to time ta1 a current that changes in accordance with load variation is constantly supplied to the system section (the electronic circuits, driving section, and the like), and the excess current of the 500 mA is supplied to the battery 27.

The charging current is reduced from time ta1 in accordance with load variation of the system section, and if a specific operation (importing of still images, for example) is performed during time ta2, then the USB charging control section 26 stops charging of the battery 27 (blocks the charging current). While the specific operation is being performed (the specific condition is being met) in times ta2 to ta3, the USB charging control section 26 maintains the current value supplied via the USB cable 40 (300 mA, for example), and supplies current, which is lacking due to load variation in the system section, from the battery 27. At time ta3, if the specific operation ends, the USB charging control section 26 returns to the normal operation of supplying a current that changes in accordance with load variation to the system section via the USB cable 40 and supplying excess current to the battery 27 as charging current.

Next, at time ta4, if a specific operation is performed again (live image importing, for example), then the USB charging control section 26 stops the charging of the battery 27 again (blocks the charging current), and maintains the current value supplied via the USB cable 40 (300 mA) in times ta4 to ta5 while the specific operation is being performed. The USB charging control section 26 supplies current that is lacking due to load variation in the system section from the battery 27. At time ta5, if the specific operation ends, the USB charging control section 26 returns to the normal operation of supplying a current that changes in accordance with load variation to the system section via the USB cable 40 and supplying excess current to the battery 27 as charging current. In this manner, in Embodiment 1, the change in current flowing through the USB cable 40 can be reduced as shown by the solid line L2 in FIG. 4, thus making it possible to reduce EMI and noise generated from the USB cable 40.

According to Embodiment 1 described above, when specific operations that have relatively large fluctuations of current in the system section are performed, charging of the battery is temporarily stopped, the current value supplied via the USB cable 40 is maintained at a constant level, and current that is lacking due to load variation in the system section is supplied from the battery 27; therefore, the current supplied via the USB cable 40 can be stabilized without relying on load variation in the system section, and EMI and noise emitted from the USB cable 40 can be reduced.

According to Embodiment 1 described above, in a digital camera, smartphone, or the like having photography functions, EMI and noise generated from the USB cable 40 can be reduced, thus making it possible to improve image quality of photographic images.

According to Embodiment 1 described above, when a specific operation is confirmed to be running, and when it is detected that the current being supplied via the USB cable 40 is not the maximum, the charging of the battery 27 is temporarily stopped; therefore, it is possible to prevent over-discharge of the battery 27.

According to Embodiment 1 above, if a specific operation has ended, then the restrictions on current being supplied via the USB cable 40 are lifted, and normal operation is resumed so that current supplied via the USB cable 40 is allocated to the charging of the battery 27 and the driving of the system section, thus making it possible to prevent over discharge of the battery 27.

B. Embodiment 2

Next, Embodiment 2 of the present invention will be described.

B-1. Configuration of Embodiment 2

Figure 5:
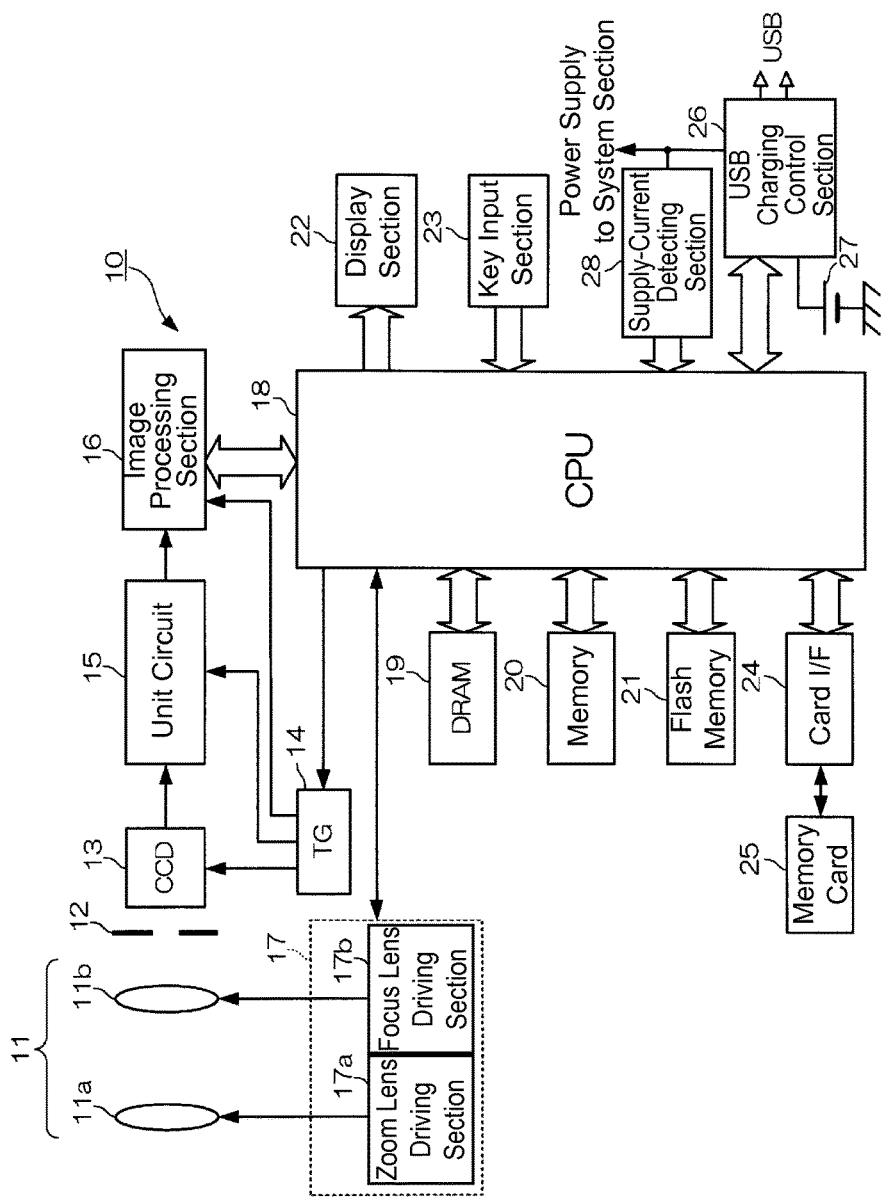
FIG. 5 is a block diagram of a digital camera according to Embodiment 2.

FIG. 5 is a block diagram of a digital camera 10 according to Embodiment 2 of the present invention. In FIG. 5, parts corresponding to those in FIG. 2 are given the same reference characters and an explanation thereof will be omitted. In FIG. 5, the digital camera 10 of Embodiment 2 has a supply-current detecting section 28 in addition to the configuration of the digital camera 10 in Embodiment 1 described above. The supply-current detecting section 28 detects the current value being supplied to the system section from a USB charging control section 26 and sends the detection results to a CPU 18. On the basis of the detection results from the supply-current detecting section 28, the CPU 18 determines whether the current supplied to the system section is greater than or equal to a first threshold (320 mA, for example; a current value that is slightly larger than the maximum current value of a specific operation and that has a current following the specific operation that can be reliably detected), and if the current supplied to the system section is greater than or equal to the first threshold, the CPU 18 sends charging control signals to the USB charging control section 26.

When the USB charging control section 26 is not receiving charging control signals from the CPU 18, the USB charging control section 26 normally supplies a current that changes in accordance with load variation to the system section among the current (500 mA) supplied via a USB cable 40, and supplies excess current to a battery 27. Meanwhile, when the USB charging control section 26 receives charging control signals from the CPU 18, if the USB current is not the maximum and the amount of charge of the battery 27 is greater than or equal to a second threshold (80%, for example), then the charging of the battery 27 is stopped and the current needed for the load fluctuations is supplied from the battery 27 to the system section. If the amount of charge of the battery 27 is less than or equal to a third threshold (70%, for example), then the USB charging control section 26 returns to normal control in order to prioritize charging of the battery 27.

B-2. Operation of Embodiment 2

Next, the operation of Embodiment 2 will be explained.

Figure 6:
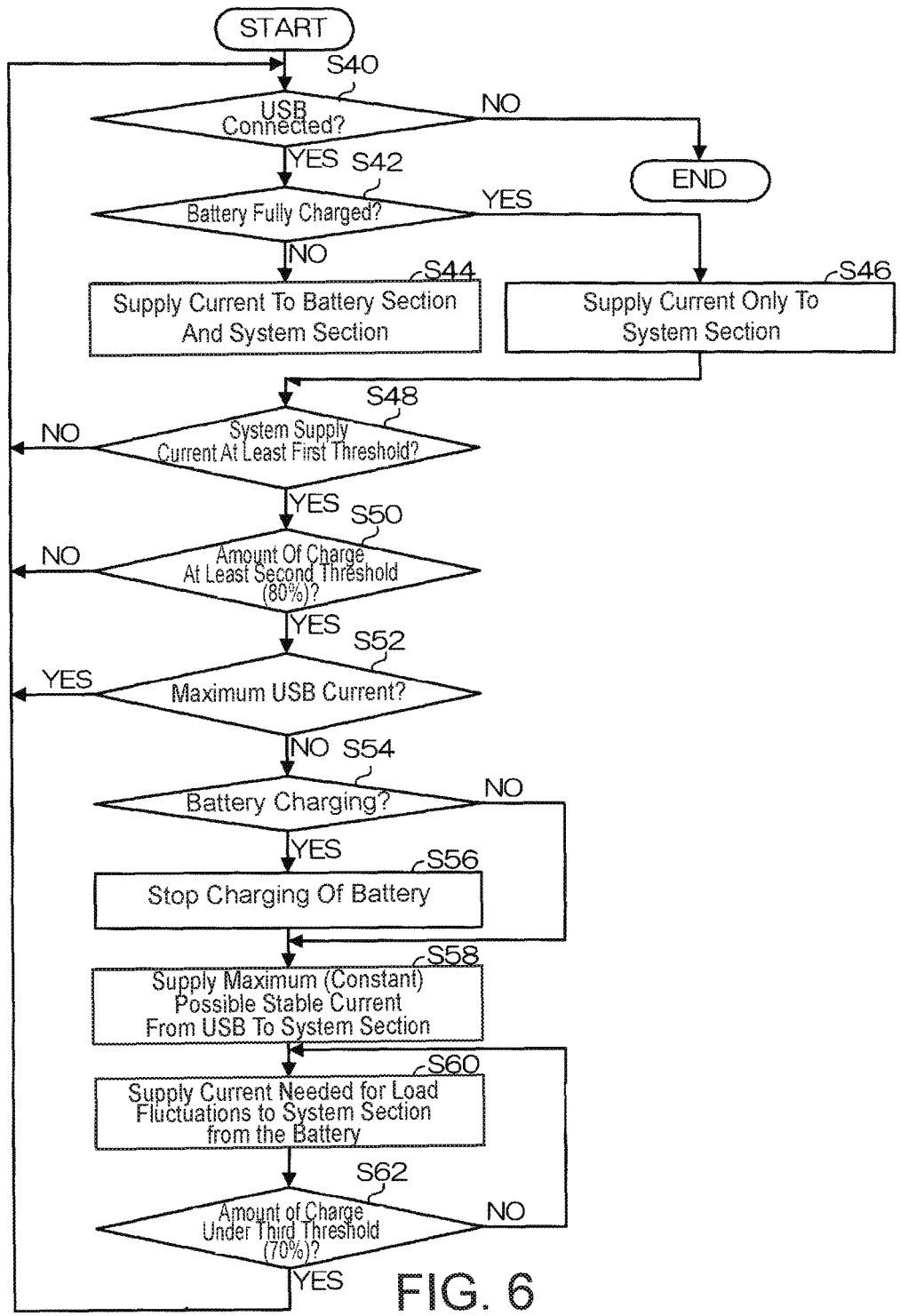
FIG. 6 is a flow chart for describing operation of the digital camera according to Embodiment 2.

FIG. 6 is a flow chart for describing an operation of the digital camera 10 according to Embodiment 2. First, the USB charging control section 26 determines whether or not the USB cable 40 is connected to a PC 30 (step S40). If the USB cable 40 is not connected to the PC 30 (NO in step S40), then the current process is terminated. However, if the USB cable 40 is connected to the PC (YES in step S40), then the USB charging control section 26 determines whether or not the battery 27 is fully charged (step S42). If the battery 27 is not fully charged (NO in step S42), then the USB charging control section 26 supplies a current that changes in accordance with load variation to the system section and supplies excess current to the battery 27 as charging current via the USB cable 40 (step S44). However, if the battery 27 is fully charged (YES in step S42), then the USB charging control section 26 only supplies a current that changes in accordance with load variation to the system section via the USB cable 40 (step S46).

Next, the CPU 18 determines whether or not the current supplied to the system section detected by the current-supply detecting section 28 is greater than or equal to a first threshold (320 mA, for example) (step S48). If the current being supplied to the system section is not greater than or equal to the first threshold (NO in step S48), then the CPU 18 judges that applications or processes (still image import processes or live image import processes) in the system section having currents with relatively large fluctuations are not running, or that the driving section (the focus motor and zoom motor driving a zoom lens 11*a* and a focus lens 11*b*) is not being driven, or namely, that a so-called specific operation is not being performed, and thus returns to step S40 and repeats the above processes. Accordingly, in this case, the CPU 18 does not send charging control signals to the USB charging control section 26.

Meanwhile, if the current supplied to the system section is greater than or equal to the first threshold (320 mA, for example), then the CPU 18 determines that it is possible that a specific operation in the system section having a current with relatively large fluctuations will be performed. In this case, first the CPU 18 determines whether or not the amount of charge of the battery 27 is greater than or equal to the second threshold (80%, for example) (step S50). The amount of charge of the battery 27 may be periodically sent from the USB charging control section 26 to the CPU 18, or may be sent from the USB charging control section 26 to the CPU 18 as needed by the CPU 18. If the amount of charge of the battery 27 is not greater than or equal to the second threshold (80%, for example) (NO in step S50), then the CPU 18 determines that the battery 27 is not sufficiently charged and returns to step S40 and repeats the processes above. In other words, the CPU 18 continues supplying the charging current to the battery 27 and continues supplying current to the system section. In this case, the CPU 18 does not send charging control signals to the USB charging control section 26.

Meanwhile, if the amount of charge of the battery 27 is greater than or equal to the second threshold (80%, for example) (YES in step S50), then the CPU 18 determines that the battery 27 is charged to a certain degree and that a temporary interruption will not be a problem. In this case, the CPU 18 sends charging control signals to the USB charging control section 26.

When the charging control signal is received from the CPU 18, the USB charging control section 26 determines whether or not the current being supplied via the USB cable 40 is the maximum (500 mA) (step S52). If the current being supplied via the USB cable 40 is the maximum (500 mA) (YES in step S52), then changes in accordance with load in the system section do not occur in the current flowing to the USB cable 40, and thus, the CPU 18 returns to step S40 and repeats the above processes.

However, if the current being supplied via the USB cable 40 is not the maximum (500 mA) (NO in step S52), then changes in accordance with load in the system section occur in the current flowing to the USB cable 40. In this case, first the USB charging control section 26 determines whether or not the battery 27 is charging (step S54). If the battery 27 is charging (YES in step S54), then the charging of the battery 27 is stopped (step S56). In other words, the USB charging control section 26 blocks charging current for charging the battery 27 from being supplied via the USB cable 40.

Next, the USB charging control section 26 supplies the maximum (constant) current (300 mA, for example) possible to be stably supplied via the USB cable 40 to the system section (step S58), and further supplies the current needed for the load fluctuations to the system section from the battery 27 that has stopped being charged (step S60). As a result, a relatively stable current that does not rely on load fluctuation of the system section for the specific operation flows to the USB cable 40, thus making it possible to reduce EMI and noise generated from the USB cable 40.

Next, the CPU 18 determines whether or not the amount of charge of the battery 27 is less than or equal to the third threshold (70%, for example) (step S62). If the amount of charge of the battery 27 is not less than or equal to the third threshold, or in other words, if the battery 27 is charged to a certain degree (NO in step S62), then the CPU 18 continues to send charging control signals to the USB charging control section 26. The USB charging control section 26 continues receiving charging control signals from the CPU 18, and thus, in step S60 the CPU 18 continues supplying current needed for the load fluctuations to the system section from the battery 27.

If the amount of charge of the battery 27 is less than or equal to the third threshold (70%, for example) (YES in step S62), then it is possible that the amount of charge of the battery 27 is insufficient, and thus the CPU 18 stops sending charging control signals to the USB charging control section 26. Due to the charging control signals from the CPU 18 being stopped, the USB charging control section 26 returns to step S40 and repeats the above processes. In other words, if the amount of charge of the battery 27 is less than or equal to the third threshold (70%, for example), then in step S44 a current that changes in accordance with load variation is supplied to the system section via the USB cable 40, and the excess current is supplied to the battery 27 as charging current. However, if the battery 27 is fully charged, then in step S46 the USB charging control section 26 only supplies a current that changes in accordance with load variation via the USB cable 40.

Figure 7:
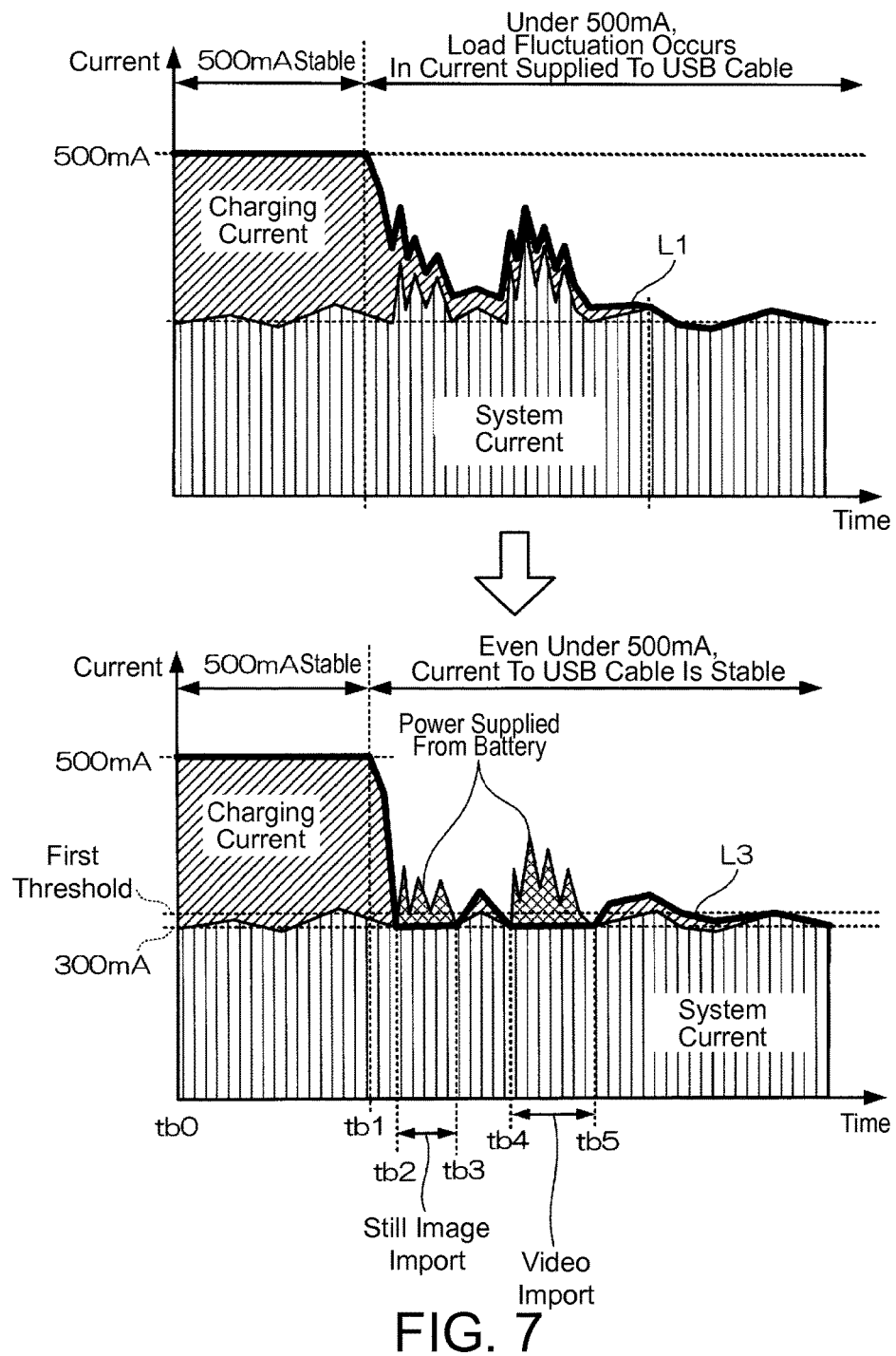
FIG. 7 is a conceptual view of one example of power being supplied to an electronic device by a USB cable according to Embodiment 2.
Figure 8:
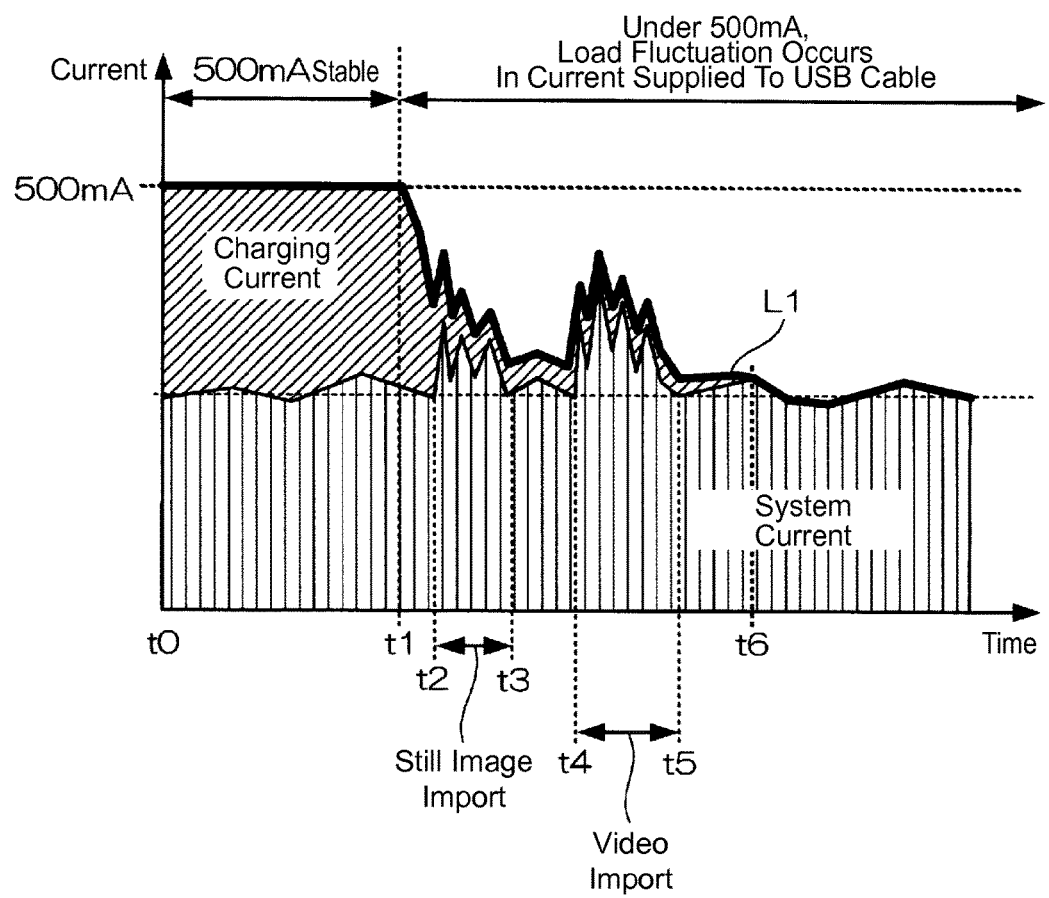
FIG. 8 is a conceptual view of one example of power being supplied to an electronic device by a USB cable using conventional technology.

FIG. 7 is a conceptual view of one example of power being supplied to an electronic device using the USB cable 40 according to Embodiment 2. In FIG. 7, the top drawing is power supply by conventional technology and the bottom drawing is power supply by Embodiment 2. Each drawing shows the horizontal axis as time and the vertical axis as supply current from the PC 30, or namely current flowing to the USB cable 40. When the USB cable 40 is connected, in times tb0 to tb1 a current that changes in accordance with load variation is constantly supplied to the system section (the electronic circuits, driving section, and the like), and the excess current of the 500 mA is supplied to the battery 27.

The charging current is reduced from time tb1 in accordance with load variation of the system section, and if in time tb2 the current supplied to the system section is greater than or equal to the first threshold (320 mA), then the CPU 18 determines that a specific operation (importing of still images, for example) has been performed. If the amount of charge of the battery 27 is greater than or equal to the second threshold (80%, for example), then the CPU 18 determines that the battery 27 is charged to a certain degree and that a temporary interruption will not be a problem. In this case, the USB charging control section 26 stops the charging of the battery 27 (blocks the charging current), and while the specific operation is being performed in times tb2 to tb3, the USB charging control section 26 maintains the current value supplied via the USB cable 40 (300 mA), and supplies current, which is lacking due to load variation in the system section, from the battery 27. In this case, at time tb3, the specific operation ends, but if the amount of charge of the battery 27 is less than or equal to the third threshold (70%), then as shown in FIG. 7 the USB charging control section 26 returns to the normal operation of supplying a current that changes in accordance with load variation to the system section via the USB cable 40 and supplying excess current to the battery 27 as charging current. On the other hand, if the amount of charge of the battery 27 is not less than or equal to the third threshold (70%) at time tb3, then the USB charging control section 26 continues to stop charging of the battery 27 and maintains the current value supplied via the USB cable 40. Current that is lacking due to load variation in the system section is supplied from the battery 27.

At time tb4, if the current supplied to the system section is again greater than or equal to the first threshold (320 mA), then the CPU 18 determines that a specific operation (live image importing, for example) has been performed. If the amount of charge of the battery 27 is greater than or equal to the second threshold (80%, for example), then the CPU 18 determines that the battery 27 is charged to a certain degree and that a temporary interruption will not be a problem. In this case, current that is lacking due to load variation in the system section is supplied to the USB charging control section 26 from the battery 27 while the specific operation in times tb4 to tb5 is performed in a state in which the charging of the battery 27 is stopped and the current value supplied via the USB cable 40 is maintained at a constant level.

Thereafter, at time tb5, if the amount of charge of the battery 27 is less than or equal to the third threshold (70%), then the USB charging control section 26 returns to the normal operation of supplying current that changes in accordance with load variation to the system section via the USB cable 40 and supplying the excess current to the battery 27 as charging current. In this manner, in Embodiment 2, the change in current flowing through the USB cable 40 can be reduced as shown by the solid line L3 in FIG. 7, thus making it possible to reduce EMI and noise generated from the USB cable 40.

According to Embodiment 2 described above, when the current supplied to the system section is greater than or equal to the first threshold, the CPU 18 determines that a specific operation will be performed and temporarily stops the charging of the battery, thereby stabilizing the current value being supplied via the USB cable 40 and supplying current that is lacking due to load variation in the system section from the battery. Thus, the current flowing to the USB cable 40 can be stabilized without relying on load variation in the system section, and EMI and noise emitted from the USB cable 40 can be reduced.

According to Embodiment 2 described above, in a digital camera, smartphone, or the like having photography functions, EMI and noise generated from the USB cable 40 can be reduced, thus making it possible to improve image quality of photographic images.

As described in Embodiment 2 described above, when the current supplied to the system section is greater than or equal to the first threshold, the CPU 18 confirms that a specific operation is being performed; therefore, the CPU 18 can also flexibly respond to specific operations that are not able to be predicted.

According to Embodiment 2 described above, when a specific operation is confirmed to have been performed, and when it is detected that the amount of current of the battery 27 is greater than or equal to the second threshold (80%), the charging of the battery 27 is temporarily stopped; therefore, it is possible to prevent over discharge of the battery 27.

According to Embodiment 2 above, if it is detected that the amount of charge of the battery 27 is less than or equal to the third threshold (70%), then the restrictions on current being supplied via the USB cable 40 are lifted, and normal operation is resumed so that current supplied via the USB cable 40 is allocated to the charging of the battery 27 and the driving of the system section, thus making it possible to prevent over discharge of the battery 27.

In Embodiment 2 described above, it is predicted that a specific operation is performed by monitoring the current supplied to the system section, but without being limited thereto, it can be predicted that a specific operation is being performed by directly monitoring whether the current flowing through the USB is exceeding a prescribed range of variation. In this case, when the current supplied by the USB cable 40 exceeds a prescribed range of variation, then it is determined that a specific operation is being performed, and therefore it is possible to flexibly respond to specific operations that are not able to be predicted.

In Embodiment 2, in step S62, when the amount of charge of the battery 27 is less than or equal to the third threshold (70%, for example), the CPU 18 returned to normal control by returning to step S40, but without being limited thereto, the CPU 18 may return to normal control by returning to step S40 when the current supplied to the system section from the battery 27 becomes smaller than the first threshold (320 mA). In this case, however, if the current supplied to the system section is hovering around the first threshold, then control will become unstable, and thus normal control may be returned to when a prescribed amount of time has passed after the current supplied to the system section from the battery 27 becomes smaller than the first threshold.

In Embodiments 1 and 2 described above, examples were shown in which the maximum current supplied by the USB cable is 500 mA, but the maximum current supplied by the USB cable is not limited to 500 mA, and may be a maximum value corresponding to the specifications of the USB cable. Furthermore, the power supply cable is not limited to a USB cable, and may be any cable that is capable of supplying power to an electronic device.

Embodiments of the present invention were described above, but the present invention is not limited thereto, and also encompasses the configurations stated in the claims and their equivalents.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:
1. An electronic device, comprising:
a battery that can be charged;
a system section; and
a charging control section connected to the system section and the battery, the charging control section being configured to receive external power from an external device via a cable, the charging control section allo- cating electrical current that is supplied from the external device to the system section for use thereby and the battery for charging,
wherein the charging control section stops charging of the battery temporarily when a prescribed condition is met in the system section and said electrical current supplied via the cable is not a maximum current for the cable,
wherein the charging control section regulates the electrical current supplied via the cable to be at a constant level below said maximum current while the charging of the battery is temporarily stopped, and
wherein the charging control section supplies electrical current from the battery to the system section as needed to meet a power demand by the system section that is not met by the electric current via the cable, while the electrical current supplied via the cable is being regulated to be at the constant level.

2. The electronic device according to claim 1, wherein, when the prescribed condition ends, the charging control section stops regulating the electrical current supplied via the cable and allocates the electrical current through the cable to the battery for charging and the system section.

3. The electronic device according to claim 1, further comprising: a detecting section that detects electrical current flowing from the charging control section to the system section,
wherein said prescribed condition is met when the detected electrical current flowing from the charging control section to the system section becomes greater than or equal to a first threshold that is smaller than said maximum current for the cable and that is greater than said constant level.

4. The electronic device according to claim 1, wherein said prescribed condition is met when fluctuations in the electrical current supplied via the cable exceed a prescribed range.

5. The electronic device according to claim 1,
wherein said electrical current supplied via the cable is not said maximum current for the cable when the amount of charge of the battery is greater than or equal to a second threshold that is less than a fully charged amount and that is greater than zero.

6. The electronic device according to claim 5, wherein the charging control section stops regulating the electrical current supplied via the cable and allocates the electrical current to the battery for charging and the system section when the amount of charge of the battery becomes less than or equal to a third threshold that is smaller than the second threshold and that is greater than zero even if the prescribed condition continues to be met.

7. The electronic device according to claim 1, wherein the cable is a Universal Serial Bus cable that is capable of supplying said maximum current.

8. A method of allocating electrical current that is supplied from an external device via a cable to a battery and a system section in an electronic device having said battery and said system section, the method comprising:
stopping charging of the battery temporarily when a prescribed condition is met in the system section and said electrical current supplied via the cable is not a maximum current for the cable;
regulating the electrical current supplied via the cable to be a constant level below said maximum current while the charging of the battery is temporarily stopped; and
supplying electrical current from the battery to the system section as needed to meet a power demand by the system section that is not met by the electric current via the cable, while the electrical current supplied via the cable is being regulated to be at the constant level.

9. A digitally-readable non-transitory storage medium that stores instructions executable by a processor in an electronic device that allocates electrical current that is supplied from an external device via a cable to a battery and a system section, the instructions causing the electronic device to perform the following:
stopping charging of the battery temporarily when a prescribed condition is met in the system section and said electrical current supplied via the cable is not a maximum current for the cable;
regulating the electrical current supplied via the cable to be at a constant level below said maximum current while the charging of the battery is temporarily stopped; and
supplying electrical current from the battery to the system section as needed to meet a power demand by the system section that is not met by the electric current via the cable, while the electrical current supplied via the cable is being regulated to be at the constant level.

10. The electronic device according to claim 1, wherein said prescribed condition is met when a prescribed operation is performed in the system section.

11. The method according to claim 8, wherein said prescribed condition is met when a prescribed operation is performed in the system section.

12. The digitally-readable non-transitory storage medium according to claim 9, wherein said prescribed condition is met when a prescribed operation is performed in the system section.

13. The electronic device according to claim 3, wherein the charging control section stops regulating the electrical current supplied via the cable and allocates the electrical current to the battery for charging and the system section when a prescribed time has passed since the detected electrical current flowing from the charging control section to the system section becomes less than the first threshold.

14. The electronic device according to claim 1,
wherein said constant level is a current level that the cable can stably provide, and
wherein the charging control section supplies an entirety of the electrical current that is being regulated at said constant level to the system section.

15. The electronic device according to claim 3, wherein the first threshold is a level of current that accompanies a prescribed operation in the system section so that the prescribed operation in the system section can be detected by detecting that the detected electrical current exceeds the first threshold.

* * * * *